C. STANLEY.
VEHICLE WHEEL.
APPLICATION FILED MAY 13, 1907.

909,034.

Patented Jan. 5, 1909.
2 SHEETS—SHEET 2.

WITNESSES:

INVENTOR.
Charles Stanley
BY
Frank P. Medina
ATTORNEY.

UNITED STATES PATENT OFFICE.

CHARLES STANLEY, OF SAN FRANCISCO, CALIFORNIA, ASSIGNOR TO ECONOMIC SAFETY AUTOMOBILE WHEEL COMPANY, OF ALAMEDA COUNTY, CALIFORNIA, A CORPORATION.

VEHICLE-WHEEL.

No. 909,034.

Specification of Letters Patent.

Patented Jan. 5, 1909.

Application filed May 13, 1907. Serial No. 373,448.

*To all whom it may concern:*

Be it known that I, CHARLES STANLEY, a citizen of the United States, and resident of the city and county of San Francisco, State of California, have invented certain new and useful Improvements in Vehicle-Wheels, of which the following is a specification.

The object of my invention is to provide a vehicle wheel of the pneumatic tire type in which the tire shall be protected against the common sources of injury, as sharp substances in the roadway, by introducing means for removing said tire from direct contact with the ground.

A second object of my invention is, in a vehicle wheel of the pneumatic tire type, to interpose between the pneumatic tire and the ground, a protective rim composed of material less subject to injury than flexible rubber from contact with sharp substances in the roadway.

A third object of my invention is, in a vehicle wheel of the type referred to, to provide novel means for securing a pneumatic tire.

Other objects will appear in the following specification.

My objects I accomplish by means illustrated in the accompanying drawings of which—

Figure 1:
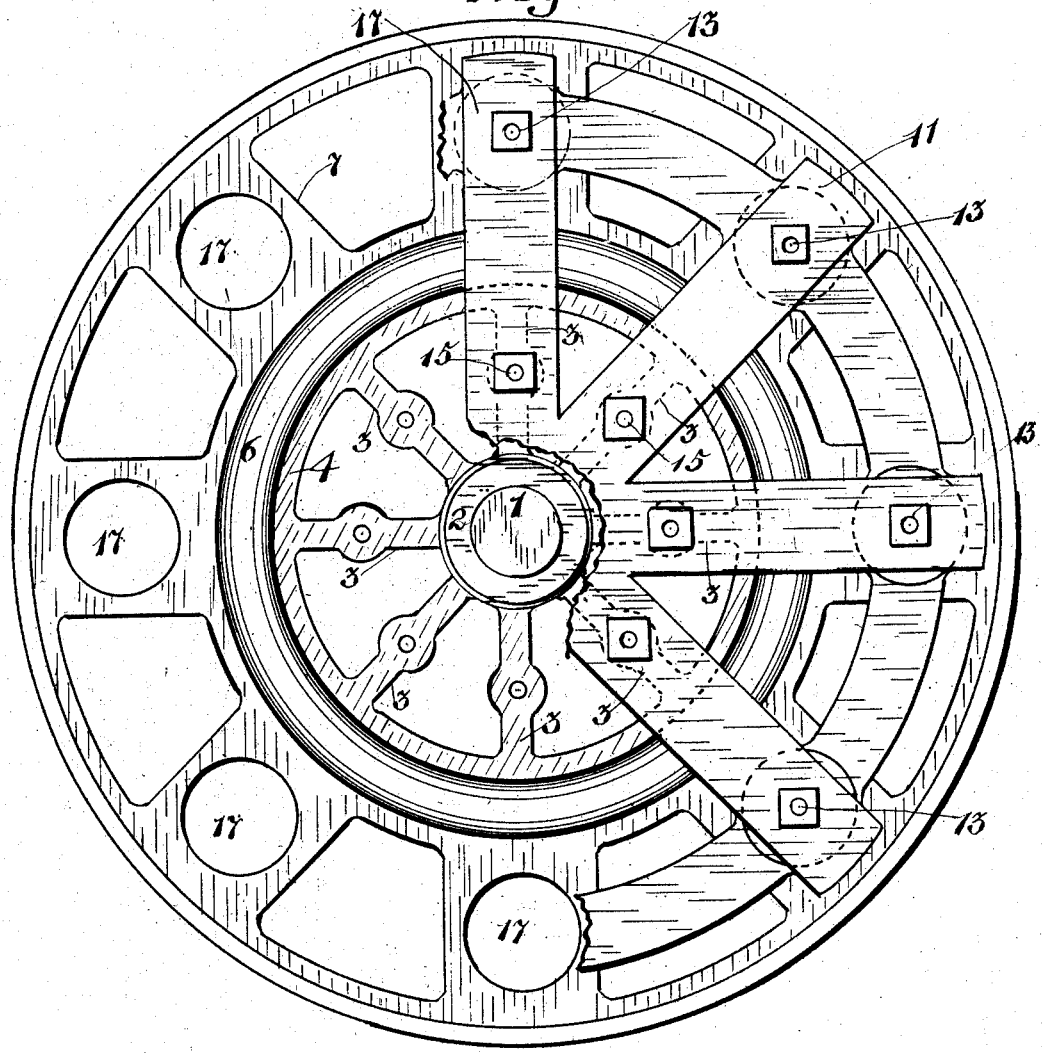
Figure 2:
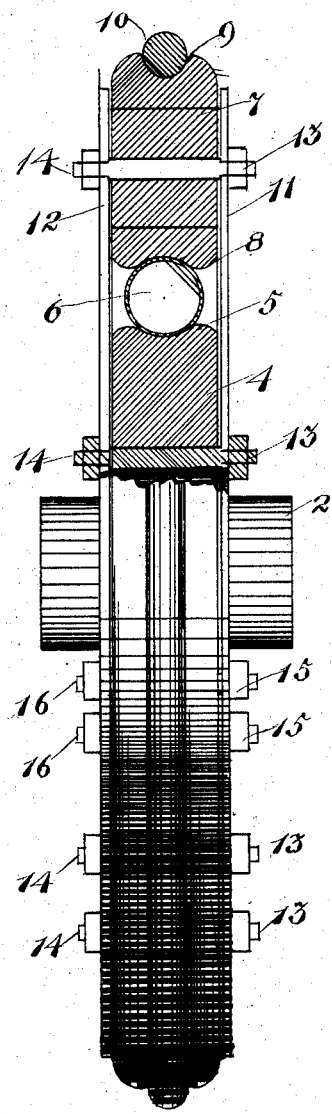

Figure 1 is a side elevation of my improved wheel with part broken away; Fig. 2 a front elevation thereof partly in section.

Similar numerals of reference refer to similar parts throughout the several views.

In general my invention consists of the combination with a pneumatic tire, of a hub having spokes and a grooved rim adapted to receive a portion of said tire, a rim composed of suitable material arranged to occupy a position between said tire and the ground, and having a groove adapted to receive another and diametrically opposite portion of said tire, and means for preventing undue lateral movements of parts of my device outside the plane of the wheel.

It also consists of the novel protective rim surrounding the pneumatic tire, and removing it from contact with the ground.

It also consists of the novel means for securing the pneumatic tire, comprising an inner grooved rim held in place by lateral plates.

Referring now to the drawing 1 is an axle, 2 is a hub having spokes 3 and a rim 4. Said rim is grooved as shown at 5 in Fig. 2 to receive the tire 6, which is the pneumatic tire referred to. I provide an outer rim for said tire which is marked 7 on the drawing. This outer rim has a grooved portion as at 8 Fig. 2 securing the opposite part of said tire in the manner shown. Exteriorly to said outer rim there is a grooved part 9 which carries a solid rubber tire 10. The edges of the groove into which said tires are secured are rounded off as shown in the drawing whereby, when the tires are expanded they meet no cutting surfaces.

I provide stay-plates 11 and 12 bolted together by means of shouldered bolts some of which are shown at 13 and 14. The shoulders thereof are set such a distance apart as to keep plates 11 and 12 from contact with rim 7. Plates 11 and 12 are rigidly bolted to spokes 3 of hub 2. Bolts 13 and 14 pass through apertures 17 in rim 7, said apertures being many times larger than the bolts passing therethrough and allowing rim 7 free play for several inches upwards and downwards as well as sidewise, and backward and forward.

By the construction described, pneumatic tube 6 is lifted entirely off the ground by the interposition of rim 7. The plane of rim 7 is kept continually within the plane of hub 2 and its spokes 3 by means of plates 11 and 12 bolted together as aforesaid. Tire 6 is held in position by the coöperation of two grooved rims 4 and 7, and side plates 11 and 12. The object of the solid tire 10 is simply to avoid unnecessary noise, and may be dispensed with where noise is not objectionable.

While my wheel is especially adapted for use on automobiles I do not propose to confine myself to such use. For by means of an obvious alteration in the rim my wheel may be arranged to run on railroad tracks thereby being adapted to the use of street cars and other wheeled vehicles. The rim of my wheel which lies between the pneumatic tire and the ground is composed of rigid materials as the metals, wood, or other suitably rigid substances.

I claim:

A vehicle wheel comprising a hub, radial arms extending from said hub having bolt holes, an inner grooved rim at the extremity of said arms, a pneumatic tire partially inclosed by said rim, an outer grooved rim partially inclosing said tire and having bolt holes many times larger than the bolts they contain, side plates consisting of radial arms extending from a central portion and having bolt holes registering with the aforesaid bolt holes of said hub radial arms, and bolt holes registering with the aforesaid bolt holes of said outer grooved rim, and adapted to fit tightly the bolts passing therethrough, shouldered bolts passing through the aforesaid registered bolt holes of hub arms and side plates, and shoulder bolts passing through the aforesaid registered bolt holes of outer grooved rim and side plates.

In testimony whereof I have hereunto signed my name in the presence of two witnesses.

CHARLES STANLEY.

Witnesses:
FRANK P. MEDINA,
GEORGE A. BUDGE.